No. 755,677. PATENTED MAR. 29, 1904.
C. P. KRUS.
FISH HOOK.
APPLICATION FILED JULY 29, 1903.
NO MODEL.
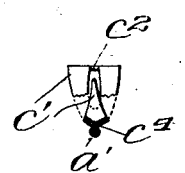
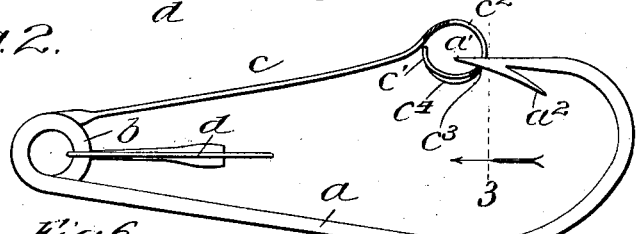
Inventor:
Charles P. Krus, No. 755,677. Patented March 29, 1904.

UNITED STATES PATENT OFFICE.

CHARLES P. KRUS, OF CHICAGO, ILLINOIS.

FISH-HOOK.

SPECIFICATION forming part of Letters Patent No. 755,677, dated March 29, 1904.

Application filed July 29, 1903. Serial No. 167,475. (No model.)

*To all whom it may concern:*

Be it known that I, CHARLES P. KRUS, a citizen of the United States, residing at Chicago, in the county of Cook and State of Illinois, have invented a new and useful Improvement in Fish-Hooks, of which the following is a specification.

My invention relates particularly to so-called "weedless" or antiweed fish-hooks; and my primary object is to provide a hook of this character possessing many of the advantages of the fish-hook described in my pending application, Serial No. 126,112, filed October 6, 1902, and possessing also additional advantages.

My invention is illustrated in its preferred embodiment in the accompanying drawings, in which—

Figure 1 represents a top view of the improved hook; Fig. 2, a side view of the same, a portion being shown in section; Fig. 3, a broken section taken as indicated at line 3 of Fig. 2, assuming the guard to be resting upon the point of the hook; Fig. 4, a side view of a modified form of the improved hook; Fig. 5, a top view of the extremity of the guard shown in Fig. 4; Fig. 6, a similar view of a development of this portion of the guard; Fig. 7, a section taken as indicated at line 7 of Fig. 4, assuming the guard to be resting upon the point of the hook; Fig. 8, a side view of a hook of still further modified form, and Fig. 9 a broken plan view of the same.

In the preferred embodiment shown in Figs. 1 to 3, inclusive, I form from a piece of steel wire a hook $a$, eye $b$, and guard $c$. The hook has a prong provided with a point $a'$ and a barb $a^2$. The eye is formed, preferably, by coiling the wire, as shown. The guard or tongue $c$ is preferably of considerably less cross-section than the hook and is formed by rolling, hammering, or stamping one end of the wire employed. Preferably the extremity of the guard is flattened and curved so as to form a loop $c'$, approximately one-half of which projects above the point of the hook. The enlargement thus produced is provided with a vertical slot $c^2$, having a lower end wall $c^3$, which bears beneath the point of the hook. The slot permits the guard to be depressed freely, and its lower wall limits the upward movement of the guard. The lower portion of the loop $c'$ is ribbed on its lower side, as shown at $c^4$, thereby providing beveled surfaces which enable the guard to be automatically depressed past the point of the hook should it accidentally get above the hook into the position shown in Fig. 3. Connected with the eye $b$ is a miniature weedless hook $d$, which may be of the same construction as the large hook just described, except that its eye is formed by a simple loop instead of a complete coil. This small hook serves as a bait-hook and may be connected with the large hook by passing the guard of the small hook through the eye of the large hook till the eyes of the two hooks are interlocked. When in position, the bait-hook is supported near the eye of the large hook and in the plane of the longitudinal axis of the large hook.

In the modification shown in Figs. 4 to 7, inclusive, $f$ represents the fish-hook, and $g$ the guard thereof. The guard is provided with a slotted curved flat end $g'$, which shelters the point of the hook in the manner shown. The extreme free end portion of the guard is pointed at $g^2$, as shown in Figs. 6 and 7. Should the guard by accident get into the position shown in Fig. 7, it would still shelter the point of the hook and a fish in biting would depress the guard freely.

In the construction shown in Figs. 8 and 9, $h$ represents the hook, and $h'$ the guard. The construction is similar to the construction shown in Fig. 4, except that the extremity $h^3$ of the guard is turned toward the barb of the hook, and at this portion of the guard a depressed point $h^4$ is provided to afford beveled surfaces on the lower side.

It will be understood that the smaller bait-hook $d$ may be employed in connection with either of the fish-hooks shown, or not, as desired. Bait may be applied simply to the bait-hook or both the bait-hook and the fish-hook. The object of locating the bait-hook in the position shown is to lure the fish to bite farther up on the hook than is ordinarily done. The bait-hook itself is weedless, as explained. It is noteworthy that in each of the constructions shown in Figs. 2, 4, and 8 the guard has at its extremity an enlargement, which for practical purposes may be regarded as struck on the radius of a circle, the upper portion of the enlargement being provided with a vertical slot which receives the point of the hook, the extremity of the point of the hook lying near the center of curvature of the enlargement. Thus it will be understood that the hook-point is thoroughly sheltered and protected from weeds. The lower end of the slot at the extremity of the guard bears normally beneath the point of the hook. If by accident the guard should get above the hook and rest upon the point thereof, the point would still be sheltered from weeds and the beveled surface at the lower side of the enlargement would permit the guard to be depressed freely by the fish in biting. In each of the constructions shown the guard is preferably of less cross-section near its base portion than it is at its free extremity, as shown in Figs. 1 and 2. In each construction the guard is normally closed, is carried by the shank of the hook, and is freely depressed. Preferably the guard is in each instance formed integrally with the eye of the hook, as explained.

It is noteworthy that my present invention provides for sheltering the point of the hook effectively, while maintaining the guard of a length which is not objectionable. This permits the fish to take the hook more readily, while at the same time providing against distortion of the guard by the fish. The guard is self-closing in each case and, as in the construction shown in the above-mentioned application, serves as a lock to prevent the fish from getting off the hook.

Changes in minor details of construction within the spirit of my invention may be made. Hence no undue limitation should be understood from the foregoing detailed description.

What I regard as new, and desire to secure by Letters Patent, is—

1. An improved article of manufacture, comprising a hook having a suitable point and barb, and a self-closing depressible flat spring-guard carried by the shank of the hook and having at its extremity a curved portion provided with a slot through which the point of the hook projects.

2. An improved article of manufacture, comprising a hook having a suitable point and barb, and a self-closing depressible flat spring-guard carried by the shank of the hook and having at its extremity a curved portion provided with a slot through which the point of the hook projects, said guard terminating in a downturned point.

3. An improved article of manufacture, comprising a hook having a suitable point and barb, and a normally closed depressible spring-guard carried by the shank of the hook and having a flattened extremity, curved to form substantially a half-circle and provided at said half-circle with a vertical slot to receive the point of the hook and through which the point extends, the lower end of said slot bearing against the under surface of the point of the hook, for the purpose set forth.

4. An improved article of manufacture, comprising a hook having a suitable point and barb, and a normally closed depressible guard formed integrally with the eye of the hook and having a flattened extremity formed into a loop, the upper portion of the loop having a vertical slot receiving the point of the hook and the lower portion of the loop being beveled at its under side to permit free depression of the guard from a position above the point of the hook, for the purpose set forth.

5. An improved article of manufacture, comprising a hook having a suitable point and barb, and a normally closed depressible guard formed integrally with the eye of the hook and having a flattened extremity formed into a loop, the upper portion of the loop having a vertical slot receiving the point of the hook and the lower portion of the loop comprising a downturned pointed extremity permitting free depression of the guard from a position above the point of the hook, for the purpose set forth.

CHARLES P. KRUS.

In presence of—
WALTER N. WINBERG,
SAML. G. PRINCE.